United States Patent
Dong (10) Patent No.: US 9,384,369 B2
(45) Date of Patent: Jul. 5, 2016

(54) INFORMATION PROCESSING METHOD AND ELECTRONIC DEVICE

(71) Applicants: Beijing Lenovo Software Ltd., Beijing (CN); Lenovo (Beijing) Co., Ltd., Beijing (CN)

(72) Inventor: Qiang Dong, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 131 days.

(21) Appl. No.: 14/229,933

(22) Filed: Mar. 30, 2014

(65) Prior Publication Data
US 2015/0042575 A1  Feb. 12, 2015

(30) Foreign Application Priority Data

Aug. 8, 2013  (CN) .......................... 2013 1 0344124
Aug. 8, 2013  (CN) .......................... 2013 1 0344167

(51) Int. Cl.
| | | |
|---|---|---|
| *G06F 21/82* | (2013.01) | |
| *G06F 21/32* | (2013.01) | |
| *G06F 21/74* | (2013.01) | |
| *H04W 12/12* | (2009.01) | |
| *H04L 29/06* | (2006.01) | |

(52) U.S. Cl.
CPC ................ *G06F 21/82* (2013.01); *G06F 21/32* (2013.01); *G06F 21/74* (2013.01); *H04W 12/12* (2013.01); *G06F 2221/2105* (2013.01); *G06F 2221/2147* (2013.01); *H04L 63/0861* (2013.01)

(58) Field of Classification Search
CPC ....... G06F 21/32; G06F 21/36; G06F 21/316; G06F 21/62188; G06F 21/88; G06F 3/0488; G06F 3/04883; G06F 3/04817; G06F 3/0482; G06F 3/0481; G06F 3/017; G06F 3/0484; G06F 3/0485; G06F 2221/2139; G06F 2221/2141; G06F 2221/2143; G06F 2221/2147; G06F 2221/2149; G06Q 20/3674; G06K 9/00006; G06K 9/00013; H04M 1/72519; H04M 2250/22; H04W 12/06
See application file for complete search history.

(56) References Cited

U.S. PATENT DOCUMENTS

| | | | | |
|---|---|---|---|---|
| 2002/0168961 | A1* | 11/2002 | Ohba ....................... | H04M 1/67 455/410 |
| 2007/0021103 | A1* | 1/2007 | Zhao ........................ | H04M 1/66 455/410 |
| 2009/0083847 | A1* | 3/2009 | Fadell .................... | G06F 21/316 726/16 |

(Continued)

*Primary Examiner* — Nalini Mummalaneni
(74) *Attorney, Agent, or Firm* — Harness, Dickey & Pierce, P.L.C.

(57) ABSTRACT

An information processing method and electronic device are provided. The electronic device includes a biometric feature acquisition unit and a display unit. The method includes: determining whether an unlock operation is received in when the electronic device is in a lock-screen state, to obtain a first determination result; obtaining first biometric feature information of a user with the biometric feature acquisition unit during a process for performing the unlock operation when the first determination result indicates that the unlock operation is received; determining whether the first biometric feature information matches preset feature information to obtain a second determination result; generating a first backup instruction for backing-up first data in the electronic device when the second determination result indicates that the first biometric feature information does not match the preset feature information; and executing the first backup instruction to backup the first data into a second electronic device.

16 Claims, 4 Drawing Sheets

(56) References Cited

U.S. PATENT DOCUMENTS

2012/0133484 A1* 5/2012 Griffin .................... G06F 21/51
                                                    340/5.54

2013/0173556 A1* 7/2013 Grigg ...................... H04L 67/04
                                                    707/667

* cited by examiner

INFORMATION PROCESSING METHOD AND ELECTRONIC DEVICE

CROSS REFERENCE TO RELATED APPLICATIONS

This application claims priority to Chinese Patent Application No. 201310344124.7, entitled "INFORMATION PROCESSING METHOD AND ELECTRONIC DEVICE", filed with the Chinese State Intellectual Property Office on Aug. 8, 2013, and priority to Chinese Patent Application No. 201310344167.5, entitled "INFORMATION PROCESSING METHOD AND ELECTRONIC DEVICE", filed with the Chinese State Intellectual Property Office on Aug. 8, 2013, which are incorporated herein by reference in their entireties.

FIELD OF THE DISCLOSURE

The disclosure relates to the field of electronic technology, and more particularly, to an information processing method and an electronic device.

BACKGROUND OF THE DISCLOSURE

At present, more and more electronic devices have been brought into people's life and provide a variety of applications for users with the development of electronic technology. As an example, the existing smart phone may provide a backup function in addition to a communication function. When a user stores a new contact into a mobile phone, the backup function of the mobile phone may be additionally used to backup the new contact to avoid loss of the contact's number. Specifically, the mobile phone sends the number for the contact to a cloud server and stores the number into the cloud server upon receiving a backup instruction from the user.

However, the applicant finds that the number in the mobile phone is generally backed-up upon the mobile phone receiving an operation from the user. Additionally, such backup occurs at a certain interval such as every five days, one month or half a year, and the backup will not be performed by the mobile phone until the user initiates a backup operation. Accordingly, if a new contact is stored in the mobile phone during the interval, the new contact cannot be backed-up within the interval. Numbers for contacts in the mobile phone are likely to be deleted by others if the mobile phone is lost within the interval. When the user of the mobile phone retrieves the numbers for the contacts, the backed-up contacts may be downloaded from the cloud server while those not backed-up are lost together with the mobile phone. As such the retrieved contacts by the user are incomplete.

Therefore, the technical problem is that information not backed-up is not stored in the electronic device on the occasion that the information is deleted by others.

SUMMARY OF THE DISCLOSURE

The disclosure provides an information processing method and an electronic device for solving the above technical problem that information not backed-up is not stored in the electronic device on the occasion that the information is deleted by others.

In an aspect, the disclosure provides a solution as follows according to an embodiment of the application.

An information processing method, applied to an electronic device with a biometric feature acquisition unit and a display unit, includes: determining whether an unlock operation is received in a case that the electronic device is in a lock-screen state, to obtain a first determination result; obtaining first biometric feature information of a user with the biometric feature acquisition unit during a process for performing the unlock operation in a case that the first determination result indicates that the unlock operation is received; determining whether the first biometric feature information matches preset feature information to obtain a second determination result; generating a first backup instruction for backing-up first data in the electronic device in a case that the second determination result indicates that the first biometric feature information does not match the preset feature information; and executing the first backup instruction to backup the first data into a second electronic device.

Obtaining first biometric feature information of a user with the biometric feature acquisition unit during a process for performing the unlock operation in a case that the first determination result indicates that the unlock operation is received includes:

acquiring, by the biometric feature acquisition unit, the first biometric feature information of the user within a first period in a case that a duration of the unlock operation is longer than the first period.

Determining whether an unlock operation is received includes:

detecting whether a touch operation originated from a first region in a first direction is received on the display unit of the electronic device.

Detecting whether a touch operation originated from a first region in a first direction is received on the display unit of the electronic device includes:

detecting whether the touch operation originated from the first region in the first direction on the display unit passes through a first detection region on the display unit within the first period.

The acquiring, by the biometric feature acquisition unit, the first biometric feature information of the user within a first period includes:

controlling a fingerprint acquisition apparatus located in the first detection region on the display unit to acquire a fingerprint of the user of the electronic device within the first period.

Determining whether an unlock operation is received includes:

detecting whether a press operation on a solid key of the electronic device is received.

The acquiring, by the biometric feature acquisition unit, the first biometric feature information of the user within a first period includes:

controlling a fingerprint acquisition apparatus on the solid key of the electronic device to acquire a fingerprint of the user within the first period.

The method further includes, after displaying at least one application on the display unit, accepting a second backup instruction obtained from user operation, and backing-up the first data into the second electronic device according to the second backup instruction.

In another aspect, in another embodiment of the application, the disclosure provides:

an electronic device with a biometric feature acquisition unit and a display unit, includes: a receiving unit for determining whether an unlock operation is received in a case that the electronic device is in a lock-screen state, to obtain a first determination result; the biometric feature acquisition unit for obtaining first biometric feature information of a user during a process for performing the unlock operation in a case that the first determination result indicates that the unlock operation is received; a determining unit for determining whether the first biometric feature information matches preset feature information to obtain a second determination result; a generating unit for generating a first backup instruction for backing-up first data in the electronic device in a case that the second determination result indicates that the first biometric feature information does not match the preset feature information; and a backup unit for executing the first backup instruction to backup the first data into a second electronic device.

The biometric feature acquisition unit includes:

a control module for acquiring the first biometric feature information of the user within a first period in a case that a duration of the unlock operation is longer than the first period.

The receiving unit includes:

a first detecting module for detecting whether a touch operation originated from a first region in a first direction is received on the display unit.

The first detecting module is configured to detect whether the touch operation originated from the first region in the first direction on the display unit, which passes through a first detection region on the display unit within the first period, is received.

The control module is further configured to control a fingerprint acquisition apparatus located in the first detection region on the display unit to acquire a fingerprint of the user of the electronic device within the first period.

The receiving unit includes:

a second detecting module for detecting whether a press operation on a solid key of the electronic device is received.

The control module is configured to control a fingerprint acquisition apparatus on the solid key of the electronic device to acquire a fingerprint of the user within the first period.

The electronic device further includes a backup unit for, after displaying at least one application on the display unit, accepting a second backup instruction obtained from user operation and backing-up the first data into the second electronic device according to the second backup instruction.

One or more of the above technical solutions have the following technical effect or advantages.

According to one or more of the above technical solutions, an information processing method is disclosed. The information processing method is made to solve the technical problem that information not backed-up is not stored in the electronic device on the occasion that the information is deleted by others. Initially, it is to determine whether a predefined unlock operation is received in a case that the electronic device is in a lock-screen state, to obtain a first determination result; first biometric feature information of a user is obtained with a biometric feature acquisition unit during a process for performing the unlock operation in a case that the first determination result indicates that the predefined unlock operation is received; then the input first biometric feature information is matched with preset feature information; if not match, it is indicated that the electronic device is being operated by a user other than the owner of the electronic device and is in hands of others, thereby triggering to generate a first backup instruction for backing-up first data in the electronic device; and then the first backup instruction is executed to backup the first data into a second electronic device. As an example, an instruction for backing-up numbers for contacts in a phonebook of the mobile phone is generated to backup the phonebook so as to send the complete information in the mobile phone to a cloud end (i.e., a second electronic device). Therefore, the owner of the mobile phone will not be in trouble of losing information in the mobile phone. When the owner uses a new mobile phone, the last backed-up numbers for contacts before losing the old mobile phone may be downloaded from the cloud, and thus the integrity of information is guaranteed.

DETAILED DESCRIPTION OF THE DISCLOSURE

An information processing method and an electronic device are proposed according to embodiments of the disclosure for solving the technical problem that information not backed-up is not stored in the electronic device on the occasion that the information is deleted by others. The solutions of the disclosure will be described in detail below by drawings and detailed embodiments. It is to be understood that the embodiments of the disclosure and particular features thereof are merely for the purpose of detailing the solutions of the disclosure rather than limiting the solutions. The embodiments of the disclosure and features thereof may be combined with each other unless there is a conflict.

First Embodiment

An information processing method is provided in an embodiment of the application.

The method is applied to an electronic device in the embodiment of the application.

In particular, the electronic device in the embodiment of the application may be a mobile phone, computer, tablet or the like. Further, the electronic device in the embodiment of the application includes a biometric feature acquisition unit and a display unit.

More particularly, in the embodiment of the application, supposing that the electronic device is a mobile phone, by way of example, the biometric feature acquisition unit may be a microphone (a voice acquisition unit), a camera (a image acquisition unit) or the like for acquiring a series of biometric features of a user such as a voiceprint, a iris or the like. The display unit is specifically a display screen of the mobile phone.

Figure 1:
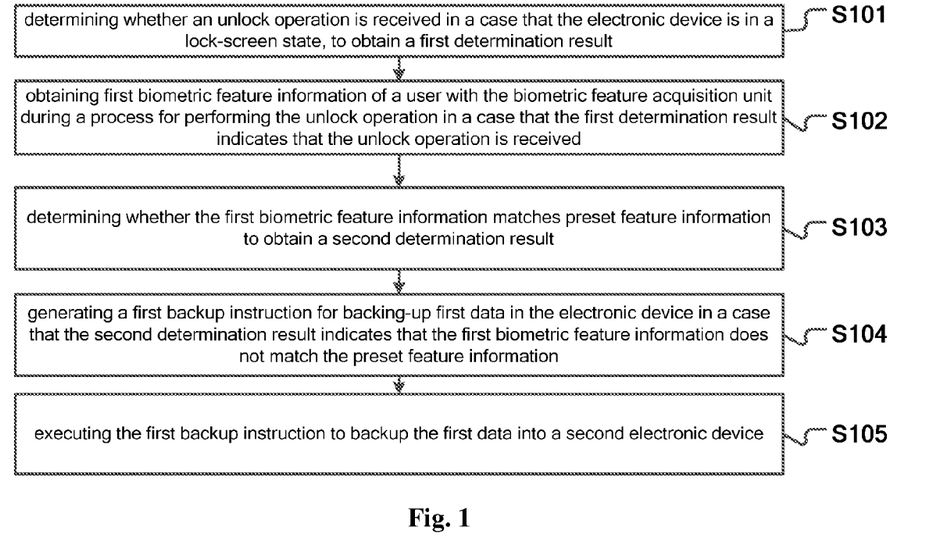
FIG. 1 is a flow chart of an information processing method in a first embodiment of the application.

Next referring to FIG. 1, the implementation of the information processing method in the embodiment of the application includes steps S101 to S105.

S101: it is to determine whether a predefined unlock operation is received in a case that the electronic device is in a lock-screen state, to obtain a first determination result.

S102: it is to obtain first biometric feature information of a user with the biometric feature acquisition unit during a process for performing the unlock operation when the first determination result indicates that the predefined unlock operation is received.

S103: it is to further determine whether the first biometric feature information matches preset feature information to obtain a second determination result.

S104: a first backup instruction for backing-up first data in the electronic device is generated in a case that the second determination result indicates that the first biometric feature information does not match the preset feature information.

S105: the first backup instruction is performed to backup the first data into a second electronic device.

Specifically, the method further includes, after the electronic device being in the lock-screen state:

Once a operation instruction from a user is detected on the electronic device, an unlock interface is displayed on the display unit.

Figure 2:
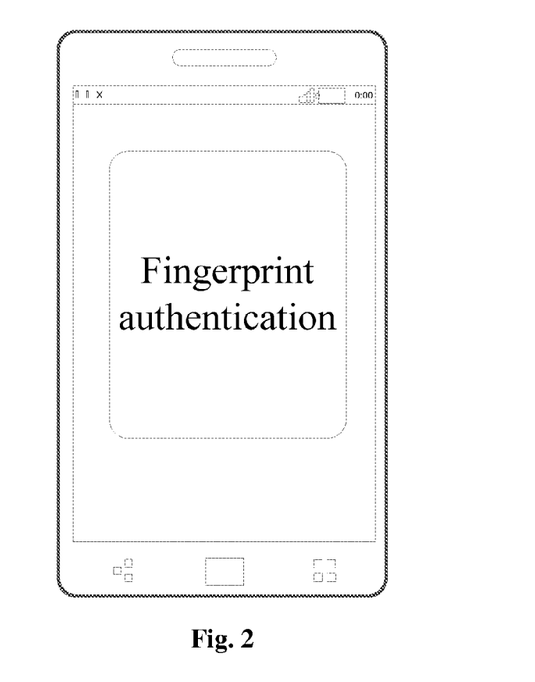
FIG. 2 is a schematic diagram of an unlock interface presented on a display screen after a mobile phone receiving an key-pressing operation from a user according to an embodiment of the application.

For example, when a user starts to operate a mobile phone, a power key at a side of the mobile phone is generally pressed at first. For the mobile phone, upon receiving the press operation from the user, it may display the unlock interface on the display screen according to the operation. At this point, the mobile phone is still in the lock-screen state. Further, the step of S101 may be performed for determining whether a predefined unlock operation is received when the electronic device is in the lock-screen state to obtain a first determination result. The user is allowed to operate the mobile phone only if the first determination result indicates that the predefined unlock operation is received. For example, after the unlock interface being displayed by the mobile phone, the user is required to enter an unlock password in the unlock interface. The user is allowed to operate the mobile phone only if the unlock successes. As shown in FIG. 2, it illustrates the unlock interface presented on the display screen after the mobile phone receiving the press operation from the user. The user is required to enter a fingerprint, and unlock may be performed only after detecting the fingerprint.

Additionally, while unlocking, the step of S102 may be performed for utilizing the biometric feature acquisition unit to obtain first biometric feature information of the user during a process for performing the unlock operation when the first determination result indicates that the predefined unlock operation is received.

The currently obtained first biometric feature information is the biometric feature information of the user. It is named as the first biometric feature information for differentiating from preset feature information.

When the biometric feature acquisition unit is utilized to obtain the first biometric feature information of the user, there are varieties of the first biometric feature information of the user such as fingerprint information, iris information, voiceprint information or the like. A different acquisition unit is required to acquire the corresponding different first biometric feature information. For example, a fingerprint acquisition unit is required when need to acquire fingerprint information of the user; and a acquisition camera is required when need to acquire iris information of the user.

Further, there are several acquisition manners as follows for utilizing the biometric feature acquisition unit to obtain the first biometric feature information of the user during a process for performing the unlock operation.

A fingerprint acquisition unit is utilized to acquire fingerprint information of the user during a process for performing the unlock operation.

Alternatively, an image acquisition unit is utilized to acquire iris information of the user during a process for performing the unlock operation.

Alternatively, a voice acquisition unit is utilized to acquire voiceprint information of the user during a process for performing the unlock operation.

For the fingerprint acquisition unit, by way of example, when the unlock interface is presented on the display screen of the mobile phone and the user is required to enter a fingerprint to verify, the user is required to enter his/her own fingerprint information in the unlock interface. Specifically, the fingerprint acquisition unit may acquire fingerprint information on the unlock interface when the user has entered his/her own fingerprint information in the unlock interface.

After acquiring the fingerprint information, it is to further determine whether the fingerprint information matches preset fingerprint information to obtain a second determination result.

Generally, the preset fingerprint information is fingerprint information of the owner of the mobile phone. Accordingly, there are two results for the determining.

As the first result, the input fingerprint information matches the preset fingerprint information.

For example, the fingerprint information input by the owner of the mobile phone is same as the preset fingerprint information. In this case, the input fingerprint information is determined as matching the preset fingerprint information.

Further, when the determination result indicates that the first biometric feature information matches the preset feature information, the electronic device is unlocked and at least one application is displayed on the display unit. The application generally refers to a native application of the mobile phone and a downloaded application. For example, the native application may be a native phonebook, short message or the like of the mobile phone, and the downloaded application may be QQ, WeChat or the like.

Still further, when the input fingerprint information is determined as matching the preset fingerprint information, the fingerprint is verified and the mobile phone is unlocked automatically. Then the user may use various functions provided in the mobile phone, and the icons of the functions may be displayed on the display unit for selecting by the user.

Still further, after the user unlocking the mobile phone, other users may use the mobile phone before relocking it.

Additionally, a period of buffer time after relocking may be set to prevent information in an application from being backed-up frequently upon other users failing to unlock the mobile phone. For example, in the case where the mobile phone is relocked after the owner A of the mobile phone having unlocked and used the mobile phone for a period of time, if a user B known by A borrows the mobile phone and enters his/her own fingerprint information to unlock, the mobile phone determines unlock failure. In such a case, if a preset period has been set, the mobile phone may determine whether the determining unlock failure is within the preset period. If so, backup for an application will not be triggered to avoid repeated backup causing waste of the resources of the electronic device.

Additionally, after the electronic device is unlocked, for an operation of the owner, a second backup instruction may be accepted and the first data may be backed-up into a second electronic device according to the second backup instruction. The second electronic device may be a cloud server or other users' mobile phone, tablet or the like. The other users generally refer to a friend who often contacts the owner or a relative of the owner or the like.

As another result, the input fingerprint information does not match the preset fingerprint information.

For example, the input fingerprint information may be that of a friend, a schoolmate. Alternatively, the input fingerprint information may be that of a criminal after the mobile phone was lost. In such a case, the input fingerprint information is determined as not matching the preset fingerprint information.

When the input fingerprint information is determined as not matching the preset fingerprint information, the fingerprint verification fails. Then the electronic device is triggered to generate the first backup instruction for backing-up the first data of the electronic device.

More specifically, the first data is not necessarily numbers in the phonebook or a picture in a picture base. Instead, the first data may be an application itself such as the phonebook application itself or the picture base itself.

For a mobile phone, by way of example, the first data may be, in particular, contact numbers in the phonebook application, short messages in a short message application, pictures in the picture base or the like. The first backup instruction is specifically used to backup contact numbers in the phonebook or important short messages and pictures or the like. The electronic device then performs the first backup instruction to backup the first data, more particularly, to backup it into a second electronic device. The second electronic device may be a cloud server or other users' phone, tablet or the like. The other users generally refer to a friend who often contacts the owner or a relative of the owner or the like. The backed-up content may be, in particular, information added in a first application, such as contact numbers added in the phonebook, short messages added in the short message application or the like.

Second Embodiment

Additionally, in the case that an electronic device is unlocked or otherwise controlled by a gesture, there is a technical problem in which the electronic device inefficiently processes an operation from a user. This is because that, in the prior art, it needs to initially acquire the trace of the user's gesture operation and then acquire biometric feature information of the user or vice versa.

So, the technical problem in which the electronic device inefficiently processes an operation from a user can be solved by an information processing method provided by the embodiment, in addition to the above technical problem that information not backed-up is not stored in the electronic device on the occasion that the information is deleted by others.

In the embodiment, it describes unlocking for a smart phone as an example. When a user unlocks the smart phone, the smart phone may initially detect whether it is in a lock-screen state. If the smart phone is detected to be in the lock-screen state, it is detected whether a user is making a first operation on the smart phone during the lock-screen state. Upon the first operation keeping a period of time longer than a first period, the smart phone is caused to switch from the lock-screen state to a normal operation status. Once such an operation is detected, the electronic device is controlled to acquire a biometric feature of the user of the electronic device within the first period, such as a fingerprint, a face image of the user or the like. As such, the acquisitions for both the biometric feature and the first operation of the user may be performed simultaneously, thereby unlocking more quickly.

Figure 3:
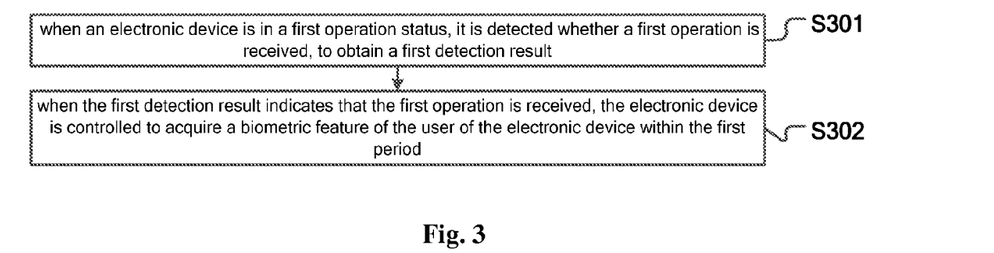
FIG. 3 is a flow chart of an information processing method in a second embodiment of the application.

As shown in FIG. 3, the information processing method of the embodiment includes steps S301 to S302.

S301: when an electronic device is in a first operation status, it is detected whether a first operation is received, to obtain a first detection result. If the first operation keeps a period of time longer than a first period, the electronic device is caused to switch from the first operation status to a second operation status.

In the embodiment, the electronic device being in the first operation status may indicate that the electronic device is in a lock-screen state, while the electronic device being in the second operation status may indicate that the electronic device is in a normal operation status. The first operation may be a lock operation.

S302: when the first detection result indicates that the first operation is received, the electronic device is controlled to acquire a biometric feature of the user of the electronic device within the first period.

In S301, detecting whether the first operation is received may include detecting whether a touch operation originated from a first region in a first direction is received on the display unit of the electronic device. The first touch operation may be a slide operation in a direction, a slide operation with certain trace pattern or a press operation on a solid key of the electronic device.

Specifically, when the first operation keeps a period of time longer than the first period, it functions to cause the electronic device to switch from the first operation status to the second operation status. In other words, the electronic device is caused to switch from the lock-screen state to the normal operation status, or the electronic device is caused to switch from the normal operation status to the lock-screen state. For example, if the electronic device is in the lock-screen state currently, the slide operation with certain trace performed on the display unit of the electronic device causes the electronic device to be unlocked. Alternatively, if the electronic device is in the normal operation status currently, the press operation performed on the power key of the electronic device causes the electronic device to be screen locked. Other specific examples will not be repeatedly described herein.

The description below is made by employing the touch operation originated from a first region in a first direction on the display unit of the electronic device and the press operation on a solid key of the electronic device as the first operation respectively for example.

In the case that the first operation is the touch operation originated from a first region in a first direction on the display unit of the electronic device, the touch operation may be, for example, a left or right slide of a finger on an application in a smart phone, or a slide with certain trace pattern on a multi-grid or the like. Other specific examples will not be repeatedly described in the embodiments of the application.

In the above first case, it determines whether the first operation meets a condition. Specifically, it determines whether the first operation passes through a first detection region on the display unit within a first period. If so, the first operation meets the condition. In the case of the multi-grid unlock, the area of the first detection region may be comparable with the area of the display unit of the electronic device. In the case of sliding unlock, alternatively, the area of the first detection region may be smaller than the area of the display unit of the electronic device. In the latter case, the first detection region is within the sliding unlock region, and the area of the first detection region is smaller than the area of the sliding unlock region.

Figure 4:
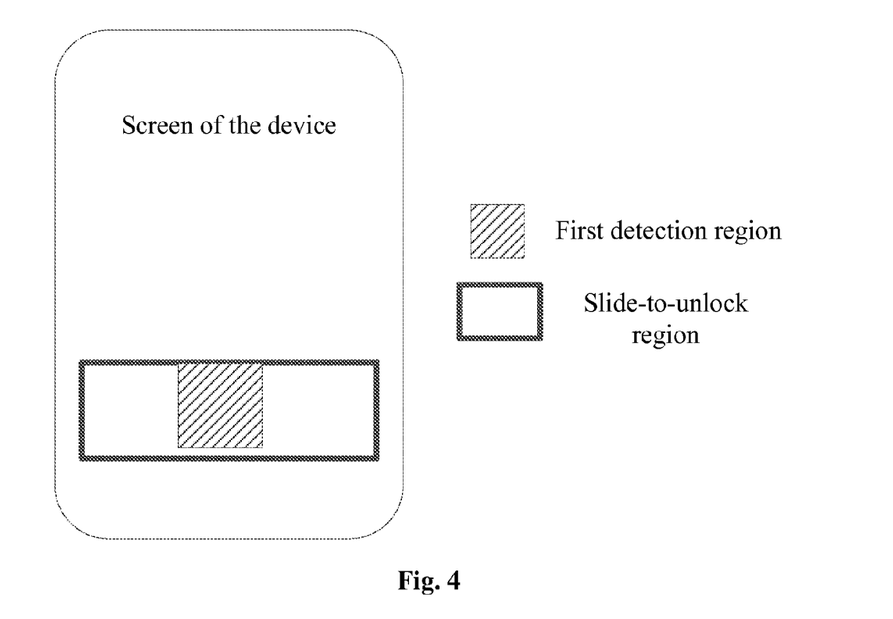
FIG. 4 is a schematic diagram of the second embodiment of the application in which the area of the overlapped region between a first detection region and a slide-to-unlock region is smaller than the area of the slide-to-unlock region.

Next, the description is made with reference to FIG. 4 in which, for example, the area of the overlapped region of the first detection region and the slide-to-unlock region is smaller than the area of the sliding unlock region. Further, the description is made with reference to FIG. 5 in which, for example, the area of the overlapped region of the first detection region and the multi-grid unlock region is equal to the area of the multi-grid unlock region.

With reference to FIG. 4, the area of the overlapped region of the first detection region and the slide-to-unlock region is smaller than the area of the slide-to-unlock region. If the first operation is detected, the electronic device is controlled to acquire a biometric feature of the user of the electronic device within the first period. Specifically, a fingerprint acquisition apparatus located at the first detection region on the display unit is controlled to acquire a fingerprint of the user of the electronic device within the first period. Alternatively, an image acquisition apparatus located at the first detection region on the display unit is controlled to acquire a face image of the user of the electronic device within the first period.

For example, the unlock region of the smart phone may be a bar region. The user is required to slide a finger from the leftmost to rightmost of the bar-like unlock region to unlock. At the same time, the fingerprint of the user is acquired. In particular, during the finger of the user sliding from the leftmost to rightmost of the bar-like unlock region, the finger of the user passes through the first detection region located at a third of the bar-like unlock region. The first detection region includes a fingerprint acquisition apparatus by which the fingerprint of the user will be acquired when the finger of the user passes through the first detection region. Alternatively, the fingerprint acquisition apparatus may be positioned at any part of the bar-like unlock region. The application is not limited in this regard.

Figure 5:
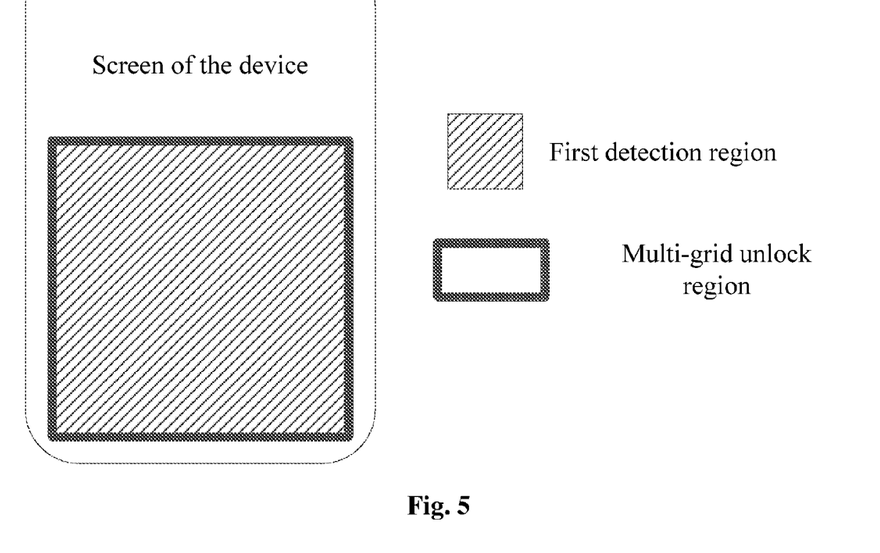
FIG. 5 is a schematic diagram of the second embodiment of the application in which the area of the overlapped region between the first detection region and a multi-grid unlock region is equal to the area of the multi-grid unlock region.

In the second case, as shown in FIG. 5, the area of the overlapped region between the first detection region and the multi-grid unlock region is equal to the area of the multi-grid unlock region. If the first operation is detected, the electronic device is controlled to acquire a biometric feature of the user of the electronic device within the first period. For example, when the finger of the user performs graphic unlock operation on the multi-grid unlock interface on the smart phone and the duration of the graphic unlock operation is longer than the first period of, for example, 2 seconds or 3 seconds, a fingerprint acquisition apparatus located at the first detection region is controlled to acquire a fingerprint of the user within the first period. Since different graphics are set by the user on the multi-grid unlock interface, the whole area of the multi-grid unlock interface is taken as the first detection region, and the fingerprint of the user may always be acquired when the user touches the multi-grid unlock interface to perform the graphic unlock operation regardless the graphics set by the user.

Since in the first case the area of the overlapped region of the first detection region and the slide-to-unlock region is smaller than the area of the slide-to-unlock region, as compared with the second case, the fingerprint of the user may be acquired by the fingerprint acquisition apparatus located at the first detection region only when the first touch operation passes through the first detection region upon detecting the first touch operation on the electronic device, i.e., upon detecting the first touch operation passing through the first detection region within the first period.

In the second case, the area of the overlapped region of the first detection region and the multi-grid unlock region is equal to the area of the multi-grid unlock region, and therefore the fingerprint of the user of the electronic device may be acquired in the multi-grid unlock region upon detecting the first touch operation of graphic unlock on the electronic device.

In the first case, when the first touch operation is detected as passing through the first detection region in the slide-to-unlock region, the acquisition apparatus may be an image acquisition apparatus. Accordingly, the image acquisition apparatus located in the first detection region may be started to be controlled to acquire the face image of the user in the first period. Of course, the image acquisition apparatus may also be provided in the multi-grid unlock region for the second case, which is not repeated herein. The acquisition apparatus may acquire iris information of the user, and the disclosure is not limited in this aspect.

In the following, the case that the first operation is a press operation on a solid key in the electronic device is described. For example, the solid key may be a power key or HOME key in the electronic device. Once the power key is pressed to unlock or lock the screen, the electronic device may control the fingerprint acquisition apparatus located on the power key to acquire the fingerprint of the user during the first period for which the press operation lasts. The case for the HOME key of the electronic device is not detailed herein.

After acquiring the biometric feature of the user with the acquisition apparatus of the electronic device in the first period for which the first operation lasts, the acquired biometric feature is matched with the pre-stored biometric feature to unlock or lock the screen conveniently.

Figure 6:
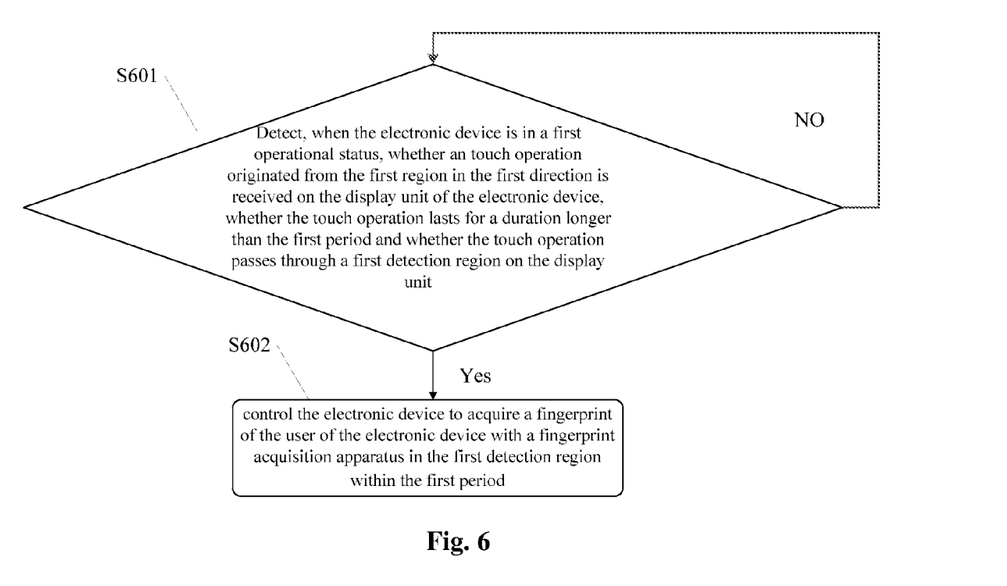
FIG. 6 is a flow chart of determining in a implementation of the information processing method in the second embodiment of the application.

In the following, a specific flow according to an embodiment of the disclosure is described. As shown in FIG. 6, the flow includes steps S601 to S602.

S601 is to detect, when the electronic device is in a first operational status, whether an touch operation originated from the first region in the first direction is received on the display unit of the electronic device, whether the touch operation lasts for a duration longer than the first period and whether the touch operation passes through a first detection region on the display unit. Once these conditions are met by the touch operation, it is determined that the touch operation originated from the first region in the first direction is received on the display unit of the electronic device, and the flow proceeds to step S602; otherwise, the step S601 is repeated.

S602 is to control the electronic device to acquire a fingerprint of the user of the electronic device with a fingerprint acquisition apparatus in the first detection region within the first period.

The case in which it is detected whether a press operation on a solid key of the electronic device is received is not detailed herein.

Of course, in the process of performing the first touch operation by the user, the electronic device may acquire the biometric feature of the user, authenticate the operation and the identify of the user through the acquired biometric feature, execute corresponding instructions upon successful authentication and failed authentication, start an application once instructed, or perform unlock or page-turning operation on the interface.

Third Embodiment

In an embodiment of the disclosure, an electronic device is provided.

In particular, the electronic device in the embodiment of the application may be a mobile phone, computer, tablet or the like. Further, as shown in FIG. 7, the electronic device in the embodiment of the application includes a biometric feature acquisition unit 701 and a display unit.

More particularly, in the embodiment of the application, supposing that the electronic device is a mobile phone, by way of example, the biometric feature acquisition unit 701 may be a microphone (a voice acquisition unit), a camera (a image acquisition unit) or the like for acquiring a series of biometric features of a user such as a voiceprint, a iris or the like. The display unit is specifically a display screen of the mobile phone.

Figure 7:
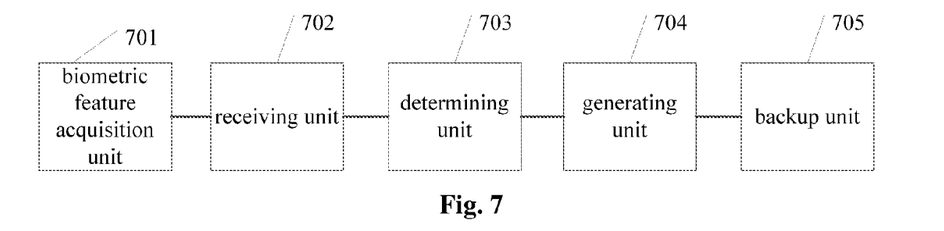
FIG. 7 is a schematic structural diagram of an electronic device in a third embodiment of the application.

Referring to FIG. 7, functions of the units are described.

A receiving unit 702 is configured for determining whether an unlock operation is received in a case that the electronic device is in a lock-screen state, to obtain a first determination result;

the biometric feature acquisition unit 701 is configured for obtaining first biometric feature information of a user during a process for performing the unlock operation in a case that the first determination result indicates that the unlock operation is received;

a determining unit 703 is configured for determining whether the first biometric feature information matches preset feature information, to obtain a second determination result;

a generating unit 704 is configured for generating a first backup instruction for backing-up first data in the electronic device in a case that the second determination result indicates that the first biometric feature information does not match the preset feature information; and a backup unit 705 is configured for executing the first backup instruction to backup the first data into a second electronic device.

Furthermore, the display unit is further configured for displaying an unlock interface according to an operation instruction once detecting the operation instruction of a user on the display unit in a case that the electronic device is in the lock-screen status.

Furthermore, the biometric feature acquisition unit 701 is configured to acquire fingerprint information of the user with a fingerprint acquisition unit during the process for performing the unlock operation; or acquire iris information of the user with an image acquisition unit during a process for performing the unlock operation; or acquire voiceprint information of the user with a voice acquisition unit during a process for performing the unlock operation.

Further, the electronic device includes an unlock unit for unlocking the electronic device and displaying at least one application on the display unit in a case that a second determination result, which is obtained after determining whether the first biometric feature information matches the preset feature information, indicates that the first biometric feature information matches the preset feature information.

Furthermore, the electronic device further includes a backup unit configured to, after at least one application is displayed on the display unit, accept a second backup instruction obtained from user operation and backup the first data into the second electronic device according to the second backup instruction.

One or more of the above technical solutions have the following technical effect or advantages.

According to one or more of the above technical solutions, an information processing method is disclosed. The information processing method is made to solve the technical problem that information not backed-up is not stored in the electronic device on the occasion that the information is deleted by others. Initially, it is to determine whether a predefined unlock operation is received in a case that the electronic device is in a lock-screen state, to obtain a first determination result; first biometric feature information of a user is obtained with a biometric feature acquisition unit during a process for performing the unlock operation in a case that the first determination result indicates that the predefined unlock operation is received; then the input first biometric feature information is matched with preset feature information; if not match, it is indicated that the electronic device is being operated by a user other than the owner of the electronic device and is in hands of others, thereby triggering to generate a first backup instruction for backing-up first data in the electronic device; and then the first backup instruction is executed to backup the first data into a second electronic device. As an example, an instruction for backing-up numbers for contacts in a phonebook of the mobile phone is generated to backup the phonebook so as to send the complete information in the mobile phone to a cloud end (i.e., a second electronic device). Therefore, the owner of the mobile phone will not be in trouble of losing information in the mobile phone. When the owner uses a new mobile phone, the last backed-up numbers for contacts before losing the old mobile phone may be downloaded from the cloud, and thus the integrity of information is guaranteed.

Fourth Embodiment

With the electronic device provided in the disclosure, the problem that information not backed-up is not stored in the electronic device on the occasion that the information is deleted by others may be resolved, and the in-efficiency in the processing to the user operation by the electronic device may be overcome.

Figure 8:
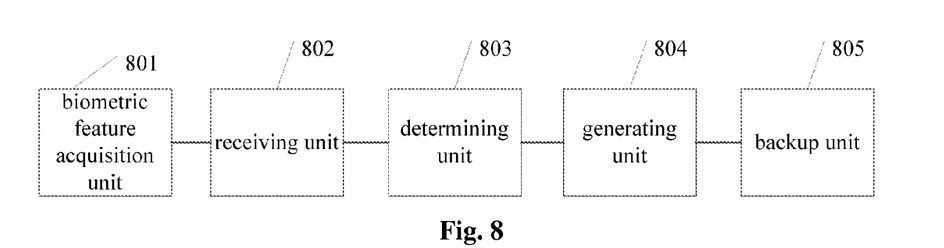
FIG. 8 is a schematic structural diagram of an electronic device in a fourth embodiment of the application.

As shown in FIG. 8, the electronic device includes a biometric feature acquisition unit 801, a receiving unit 802, a determining unit 803, a generating unit 804 and a backup unit 805. In addition, the electronic device includes a display unit.

As compared with the electronic device in the third embodiment, the biometric feature acquisition unit 801 in this embodiment may include:

a control module for acquiring the first biometric feature information of the user within a first period in a case that a duration of the unlock operation is longer than the first period.

the receiving unit 802 may include:

a first detecting module for detecting whether a touch operation originated from a first region in a first direction is received on the display unit.

Particularly, the first detecting module is configured to detect whether the touch operation originated from the first region in the first direction on the display unit, which passes through a first detection region on the display unit within the first period, is received.

In addition, the control module is further configured to control a fingerprint acquisition apparatus located in the first detection region on the display unit to acquire a fingerprint of the user of the electronic device within the first period.

In this embodiment, in addition to the structure described above, the receiving unit 802 may include:

a second detecting module for detecting whether a press operation on a solid key of the electronic device is received.

With the second detecting module, the control module may control a fingerprint acquisition apparatus on the solid key of the electronic device to acquire a fingerprint of the user within the first period.

In a case that the first detection result indicates that the first operation is received, the electronic device is controlled to acquire the biometric feature of the user of the electronic device within the first period. Therefore, the in-efficiency in the processing to the user operation by the electronic device, due to the need to extract operational trace of the user gesture first and then extract user biometric feature with a second operation or the need to extract user biometric feature first and then extract user operation, may be overcome; hence, the user operation may be processed quickly and the security of the user information may be ensured.

It should be understood by those skilled in the art that, the embodiments according to the present disclosure may be implemented as a method, system or computer program product. Hence, the embodiments of the invention may be implemented with hardware only, with software only, or with a combination of hardware and software. Furthermore, the embodiments of the present disclosure may be implemented in computer program products in the form of computer readable media (including but not limited to magnetic disk storages, optical storages, etc.) storing computer executable codes.

The description in this disclosure is made in conjunction with flowchart(s) and/or block diagram(s) of the method, device (system) or computer program product according to the embodiments of the disclosure. It should be understood that each process in the flowchart and/or each block in the block diagram and any combination of processes and/or blocks in the flowchart and/or the block diagram may be implemented through computer program instructions. The computer instructions may be provided to a processor of a general-purpose computer, dedicated computer, embedded processing machine or any other programmable data processing device to achieve a machine, in which device(s) to implement functions specified in one or more processes of the flowchart and/or one or more blocks of the block diagram is(are) achieved through executing the instructions by the computer or any other programmable data processing device.

The computer program instructions may further be stored in a computer readable storage which may lead the computer or any other programmable data processing device to operation in particular manner in order that a product including an instruction device is generated according to the instructions stored in the computer readable storage, where the instruction device is configured to implement the functions specified in one or more processes of the flowchart and/or one or more blocks of the block diagram.

The computer program instructions may further be loaded to the computer or any other programmable data processing device in order that a series of steps are executed on the computer or any other programmable data processing device to generate processes implemented by the computer, and the steps to implement the functions specified in one or more processes of the flowchart and/or one or more blocks of the block diagram are provided by the instructions executed on the computer or any other programmable data processing device.

Obviously, various changes and modifications can be made to the disclosure by those skilled in the art without departing from the spirit and scope of the disclosure. The disclosure intends to cover those changes and modifications within the scope of the claims of the invention and equivalents thereof.

What is claimed is:

1. An information processing method, applied to an electronic device comprising a biometric feature acquisition unit and a display unit, the method comprising:
    determining whether an unlock operation is received in a case that the electronic device is in a lock-screen state, to obtain a first determination result;
    obtaining first biometric feature information of a user with the biometric feature acquisition unit during a process for performing the unlock operation in a case that the first determination result indicates that the unlock operation is received;
    determining whether the first biometric feature information matches a preset feature information to obtain a second determination result and whether a period of buffer time is preset to prevent information in an application from being backed-up frequently upon other users failing to unlock the mobile phone;
    generating a first backup instruction for backing-up and storing first data in the electronic device and executing the first backup instruction to backup the first data into a second electronic device, in a case that the second determination result indicates that the first biometric feature information does not match the preset feature information and the period of buffer time has not been preset;
    determining whether the process of determining whether the first biometric feature information matches the preset feature information to obtain the second determination result is within the period of buffer time, in a case that the second determination result indicates that the first biometric feature information does not match the preset feature information and the period of buffer time has been preset, and
    generating the first backup instruction for backing-up and storing the first data in the electronic device to a second electronic device and executing the first backup instruction to backup the first data into the second electronic device in a case that the process of determining whether the first biometric feature information matches the preset feature information to obtain the second determination result is not within the period of buffer time, wherein the period of buffer time is the period between (i) the case that the second determination result indicates that the first biometric feature information matches the preset feature information and (ii) the case that the second determination result indicates that the first biometric feature information does not match the preset feature information.

2. The information processing method according to claim 1, wherein obtaining first biometric feature information of a user with the biometric feature acquisition unit during a process for performing the unlock operation in a case that the first determination result indicates that the unlock operation is received comprises:
    acquiring, by the biometric feature acquisition unit, the first biometric feature information of the user within a first period in a case that a duration of the unlock operation is longer than the first period.

3. The information processing method according to claim 1, wherein determining whether an unlock operation is received comprises:
    detecting whether a touch operation originated from a first region in a first direction is received on the display unit of the electronic device.

4. The information processing method according to claim 3, wherein detecting whether a touch operation originated from a first region in a first direction is received on the display unit of the electronic device comprises:
    detecting whether the touch operation originated from the first region in the first direction on the display unit passes through a first detection region on the display unit within the first period.

5. The information processing method according to claim 4, wherein acquiring, by the biometric feature acquisition unit, the first biometric feature information of the user within a first period comprises:
    controlling a fingerprint acquisition apparatus located in the first detection region on the display unit to acquire a fingerprint of the user of the electronic device within the first period.

6. The information processing method according to claim 2, wherein determining whether an unlock operation is received comprises:
   detecting whether a press operation on a solid key of the electronic device is received.

7. The information processing method according to claim 6, wherein acquiring, by the biometric feature acquisition unit, the first biometric feature information of the user within a first period comprises:
   controlling a fingerprint acquisition apparatus on the solid key of the electronic device to acquire a fingerprint of the user within the first period.

8. The information processing method according to claim 1, further comprising, after displaying at least one application on the display unit, accepting a second backup instruction obtained from user operation, and backing-up the first data into the second electronic device according to the second backup instruction.

9. An electronic device, comprising a biometric feature acquisition unit and a display unit, and further comprising:
   a receiving unit for determining whether an unlock operation is received in a case that the electronic device is in a lock-screen state, to obtain a first determination result;
   the biometric feature acquisition unit for obtaining first biometric feature information of a user during a process for performing the unlock operation in a case that the first determination result indicates that the unlock operation is received;
   a determining unit for determining whether the first biometric feature information matches a preset feature information, to obtain a second determination result, determining whether a period of buffer time is preset to prevent information in an application from being backed-up frequently upon other users failing to unlock the mobile phone, and determining whether the process of determining whether the first biometric feature information matches the preset feature information to obtain the second determination result is within the period of buffer time in a case that the second determination result indicates that the first biometric feature information does not match the preset feature information and the period of buffer time has been preset, wherein the period of buffer time is the period between (i) the case that the second determination result indicates that the first biometric feature information matches the preset feature information and (ii) the case that the second determination result indicates that the first biometric feature information does not match the preset feature information;
   a generating unit for generating a first backup instruction for backing-up and storing the first data in the electronic device to a second electronic device and executing the first backup instruction to backup the first data into the second electronic device in a case that the second determination result indicates that the first biometric feature information does not match the preset feature information and the period of buffer time has not been preset, or, in a case that the second determination result indicates that the first biometric feature information does not match the preset feature information, the period of buffer time has been preset, and the process of determining whether the first biometric feature information matches the preset feature information to obtain the second determination result is not within the period of buffer time; and a backup unit for executing the first backup instruction to backup the first data into the second electronic device.

10. The electronic device according to claim 9, wherein the biometric feature acquisition unit comprises:
   a control module for acquiring the first biometric feature information of the user within a first period in a case that a duration of the unlock operation is longer than the first period.

11. The electronic device according to claim 10, wherein the receiving unit comprises:
   a first detecting module for detecting whether a touch operation originated from a first region in a first direction is received on the display unit.

12. The electronic device according to claim 11, wherein the first detecting module is configured to detect whether the touch operation originated from the first region in the first direction on the display unit, which passes through a first detection region on the display unit within the first period, is received.

13. The electronic device according to claim 12, wherein the control module is further configured to control a fingerprint acquisition apparatus located in the first detection region on the display unit to acquire a fingerprint of the user of the electronic device within the first period.

14. The electronic device according to claim 10, wherein the receiving unit comprises:
   a detecting module for detecting whether a press operation on a solid key of the electronic device is received.

15. The electronic device according to claim 14, wherein the control module is configured to control a fingerprint acquisition apparatus on the solid key of the electronic device to acquire a fingerprint of the user within the first period.

16. The electronic device according to claim 9, wherein the backup unit is further configured to, after at least one application is displayed on the display unit, accept a second backup instruction obtained from user operation and backup the first data into the second electronic device according to the second backup instruction.

* * * * *